US010172336B2

(12) United States Patent
Ryu

(10) Patent No.: US 10,172,336 B2
(45) Date of Patent: Jan. 8, 2019

(54) FISHING REEL

(71) Applicant: Sang Hoon Ryu, Yongin-si (KR)

(72) Inventor: Sang Hoon Ryu, Yongin-si (KR)

( * ) Notice: Subject to any disclaimer, the term of this patent is extended or adjusted under 35 U.S.C. 154(b) by 0 days.

(21) Appl. No.: 15/578,463

(22) PCT Filed: Jun. 9, 2016

(86) PCT No.: PCT/KR2016/006107
§ 371 (c)(1),
(2) Date: Nov. 30, 2017

(87) PCT Pub. No.: WO2016/204448
PCT Pub. Date: Dec. 22, 2016

(65) Prior Publication Data
US 2018/0153148 A1 Jun. 7, 2018

(30) Foreign Application Priority Data
Jun. 19, 2015 (KR) .................. 10-2015-0087194

(51) Int. Cl.
*A01K 89/01* (2006.01)
*A01K 89/015* (2006.01)
*A01K 89/00* (2006.01)

(52) U.S. Cl.
CPC ........ *A01K 89/0183* (2015.05); *A01K 89/006* (2013.01)

(58) Field of Classification Search
CPC .. A01K 89/004; A01K 89/006; A01K 89/009; A01K 89/015; A01K 89/0183; A01K 89/0192
See application file for complete search history.

(56) References Cited

U.S. PATENT DOCUMENTS 4,155,517 A * 5/1979 Sazaki ................ A01K 89/009
242/284
5,328,128 A * 7/1994 Morris ................ A01K 89/006
242/283
5,660,344 A * 8/1997 Testa .................... A01K 89/009
242/283

(Continued)

FOREIGN PATENT DOCUMENTS

CN 203446386 U 2/2014
DE 10224618 A1 * 1/2004 .......... A01K 89/006

(Continued)

OTHER PUBLICATIONS

International Search Report for PCT/KR2016/006107 dated Aug. 24, 2016 from Korean Intellectual Property Office.

Primary Examiner — Emmanuel M Marcelo
(74) Attorney, Agent, or Firm — Paratus Law Group, PLLC

(57) ABSTRACT

A fishing reel including: a main body mounted on a fishing rod; a spool for allowing a fishing line to be wound or unwound, the spool being installed on the main body so as to be rotatable; and a fishing wheel for rotating the spool, the fishing wheel being connected to a spool shaft gearshift which induces rotation of the spool. The fishing wheel is connected to the spool shaft gearshift via angle variation means, and a connection angle between the wheel and the gearshift varies using the angle variation means to reduce strain applied on a user's wrist while rotating the spool.

4 Claims, 4 Drawing Sheets

(56) References Cited

U.S. PATENT DOCUMENTS

| | | | |
|---|---|---|---|
| 2002/0185562 A1* | 12/2002 | Landwerlen | A01K 89/006 242/283 |
| 2003/0140548 A1* | 7/2003 | Lu | A01K 89/009 43/20 |
| 2006/0071107 A1* | 4/2006 | Ochiai | A01K 89/006 242/283 |
| 2009/0283619 A1* | 11/2009 | Young | A01K 89/006 242/283 |
| 2012/0266705 A1 | 10/2012 | Little et al. | |

FOREIGN PATENT DOCUMENTS

| | | |
|---|---|---|
| JP | H03-127932 A | 5/1991 |
| JP | H11-243817 A | 9/1999 |
| KR | 20-2000-0007570 U | 5/2000 |
| KR | 20-0194992 Y1 | 9/2000 |

* cited by examiner

FISHING REEL

CROSS REFERENCE TO PRIOR APPLICATIONS

This application is a National Stage Patent Application of PCT International Patent Application No. PCT/KR2016/006107 (filed on Jun. 9, 2016) under 35 U.S.C. § 371, which claims priority to Korean Patent Application No. 10-2015-0087194 (filed on Jun. 19, 2015), which are all hereby incorporated by reference in their entirety.

BACKGROUND

The present disclosure relates to a fishing reel, and, more particularly to a fishing reel capable of preventing a user's wrist from being bent by changing the rotation angle of a fishing wheel in order to wind up a fishing line, thereby allowing the user to fish in a state where no strain is placed on the user's wrist.

In general, the fishing reel is mounted on a fishing rod, allowing a fishing line to unwind or wind. A reel's spool has the fishing line wound around there. The fishing reel includes a spinning reel and a bait-cast reel. A dual spinning reel has a rotor with the fishing line guide, and a spool that winds the fishing line around there. This reel is configured to rotate the rotor and at the same time, reciprocally move the spool, by rotating the fishing wheel.

The bait-cast reel is configured to allow baits with various weights and fishing needles mounted at the end of a fishing line to be thrown at a desired location. When throwing the bait and fishing needle, the spool rotates at high speed as the fishing line is released from the spool.

After the bait and fishing needle has been thrown, when the fish need to be pulled toward the fisher or the bait has to be replaced, the user may rotate the spool by rotating the fishing wheel rotatably coupled to one side of the spool, thereby rewind the fishing line. This allows the thrown bait and fishing needle to be returned.

A rotation shaft that rotates the spool and the fishing wheel are associated with a shift gear due to the nature of the structure thereof. Such a shift gear causes high speed rotation of the spool via the rotation of the fishing wheel. Therefore, since such a speed change gear cannot be integrally formed, it is usually coupled to the shaft by screw engagement. A separate cover is provided on the screw engagement portion to make it look beautiful. A streamlined type cover is placed over the screw engagement portion so that it does not touch the user's fingers.

As a conventional technique, Korean Utility Model Registration No. 20-0194992 (published on Sep. 1, 2000) discloses a fishing wheel coupling structure for a bait-cast reel for fishing. In this document, a recessed portion is formed in one side portion of a rotating fishing wheel body. A fishing wheel body and a rotation shaft are screw-coupled to each other in the recessed portion. The protective cover having a shape corresponding to the recessed portion of the fishing wheel body is inserted into the recessed portion without protruding. One side of the protective cover is fixed by a latching protrusion, and the other side of the protective cover is screw-coupled to the spool. Thus, by preventing any portion from projecting outward from the fishing wheel body, when the rotary fishing wheel and the spool are rotated at a high speed, friction with the user's hand is not generated at all, and the rotation is also smooth.

However, as shown in FIG. 1, in the conventional fishing reel as in the above-mentioned patent document, since the fishing wheel is always connected in a perpendicular manner to the shaft that induces the rotation of the spool, during fishing, excessive bending of the wrist of the user may occur when the fishing wheel is rotated by the user while the user grasps a hand grip that protrudes in a perpendicular manner from the fishing wheel, which is always in parallel with the fishing rod. In this way, while winding the fishing line, when the user's wrist is bent, the fishing wheel is rotated, thereby to apply a burden to the wrist, thereby increasing the fatigue of the wrist and, in severe cases, causing pain in the wrist.

SUMMARY

The present disclosure has been made in order to solve all of the above problems. More specifically, the present disclosure is to provide a fishing reel configured such that a fishing wheel is not perpendicularly connected to a spool shaft gearshift via angle variation means. Thus, when the user rotates the fishing wheel during fishing, the wrist of the user is prevented from being bent, so that it is possible to perform fishing comfortably in a state in which the occurrence of pain in the wrist is suppressed. There is no inconvenience to rotate the fishing wheel even when the user's posture changes variously during fishing. When pulling the captured fish toward the user, the fishing wheel is easy to rotate, and the user can quickly cope with it. The rotational power generated from the fishing wheel can be effectively transmitted to the spool. The present disclosure is applicable to both a spinning reel and a bait-cast reel, thereby increasing versatility thereof. In addition, the present disclosure makes it possible for a novice who is new to fishing to use the fishing rod comfortably.

In one aspect, there is provided a fishing reel comprising: a main body mounted on a fishing rod; a spool for allowing a fishing line to be wound or unwound, the spool being installed on the main body so as to be rotatable; and a fishing wheel for rotating the spool, the fishing wheel being connected to a spool shaft gearshift which induces rotation of the spool, wherein the fishing wheel is connected to the spool shaft gearshift via angle variation means, wherein a connection angle between the wheel and the gearshift varies using the angle variation means to reduce strain applied on a user's wrist while rotating the spool.

In one embodiment, the angle variation means includes a bevel gear system, wherein the bevel gear system is configured to enable the fishing wheel to be rotated in a state in which the angle of connection between the fishing wheel and the spool shaft gearshift is variable.

In one embodiment, the angle of connection between the fishing wheel and the spool shaft gearshift is in a range of 20 to 30°.

In one embodiment, wherein the angle variation means includes a universal joint or a constant velocity joint, wherein the universal joint or constant velocity joint is configured to enable the fishing wheel to be rotated in a state in which the angle of connection between the fishing wheel and the spool shaft gearshift is variable.

In one embodiment, wherein the angle variation means is detachably coupled to the fishing wheel.

As for the fishing reel according to the present disclosure, the fishing wheel is not perpendicularly connected to the spool shaft gearshift via angle variation means. Thus, when the user rotates the fishing wheel during fishing, the wrist of the user is prevented from being bent, so that it is possible to perform fishing comfortably in a state in which the occurrence of pain in the wrist is suppressed. There is no inconvenience to rotate the fishing wheel even when the user's posture changes variously during fishing. When pulling the captured fish toward the user, the fishing wheel is easy to rotate, and the user can quickly cope with it. The rotational power generated from the fishing wheel can be effectively transmitted to the spool. The present disclosure is applicable to both the spinning reel and the bait-cast reel, thereby increasing versatility thereof. In addition, the present disclosure makes it possible for a novice who is new to fishing to use the fishing rod comfortably.

DETAILED DESCRIPTIONS

Hereinafter, the configuration of the present disclosure will be described in detail with reference to the drawings.

Figure 1:
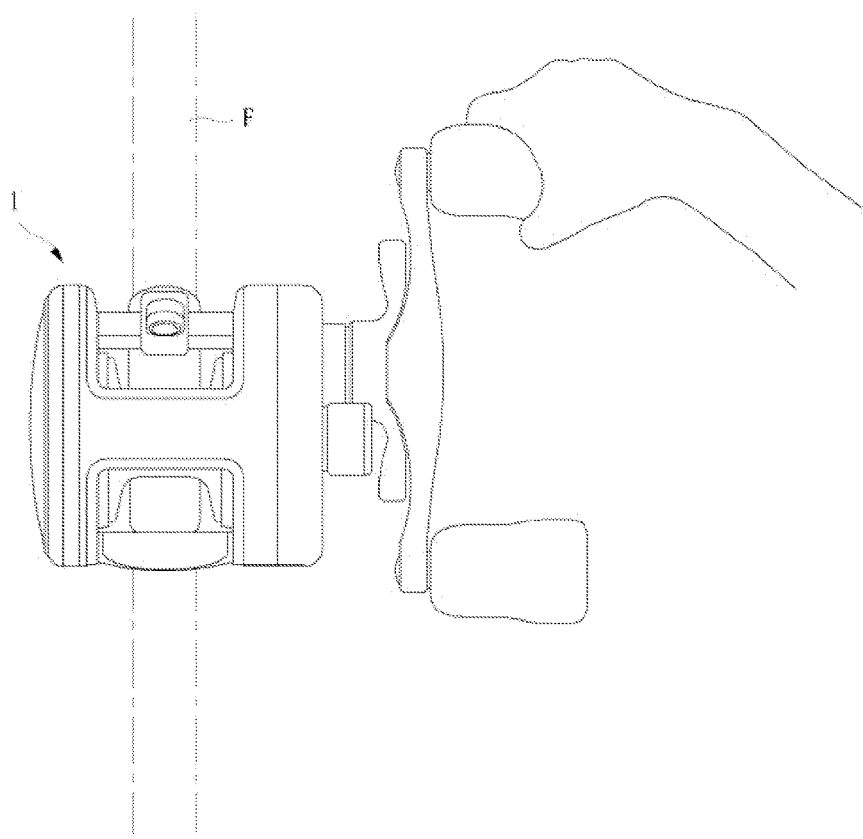
FIG. 1 is a view illustrating a conventional fishing reel.
Figure 2:
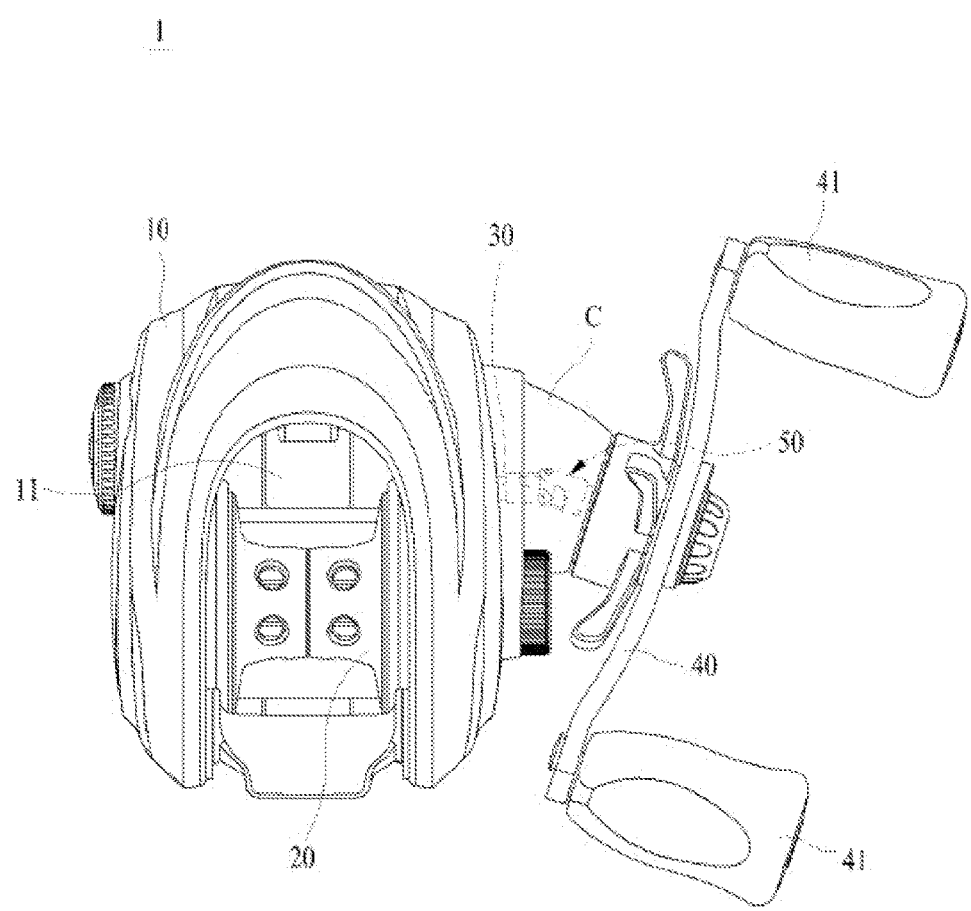
FIG. 2 is a top view of a fishing reel according to the present disclosure.
Figure 3A:
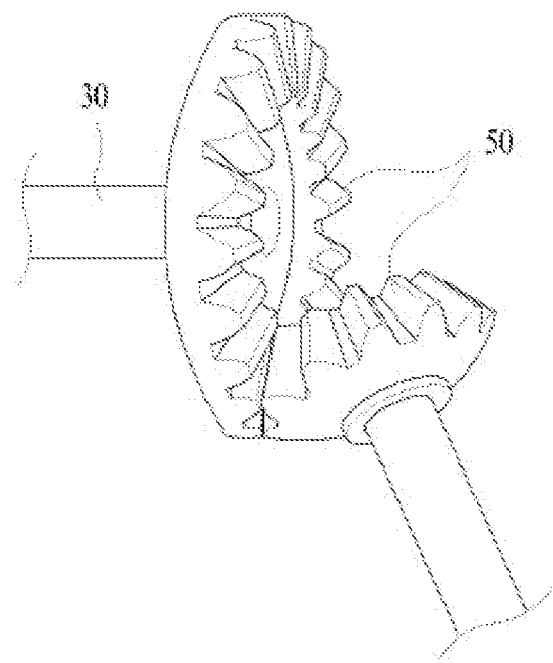
FIGS. 3A and 3B are perspective views illustrating angle variation means for the fishing reel according to the present disclosure.
Figure 3B:
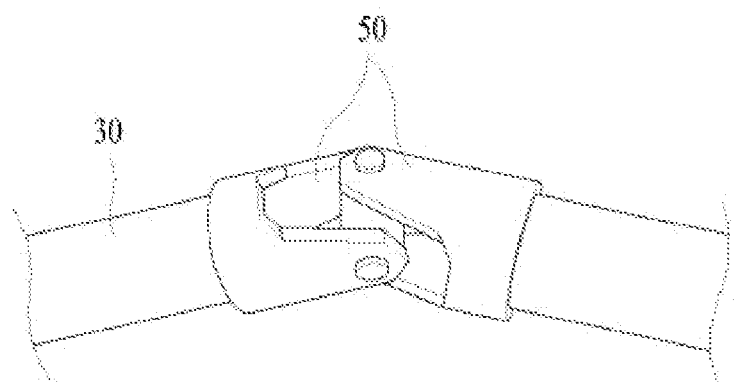
Figure 4:
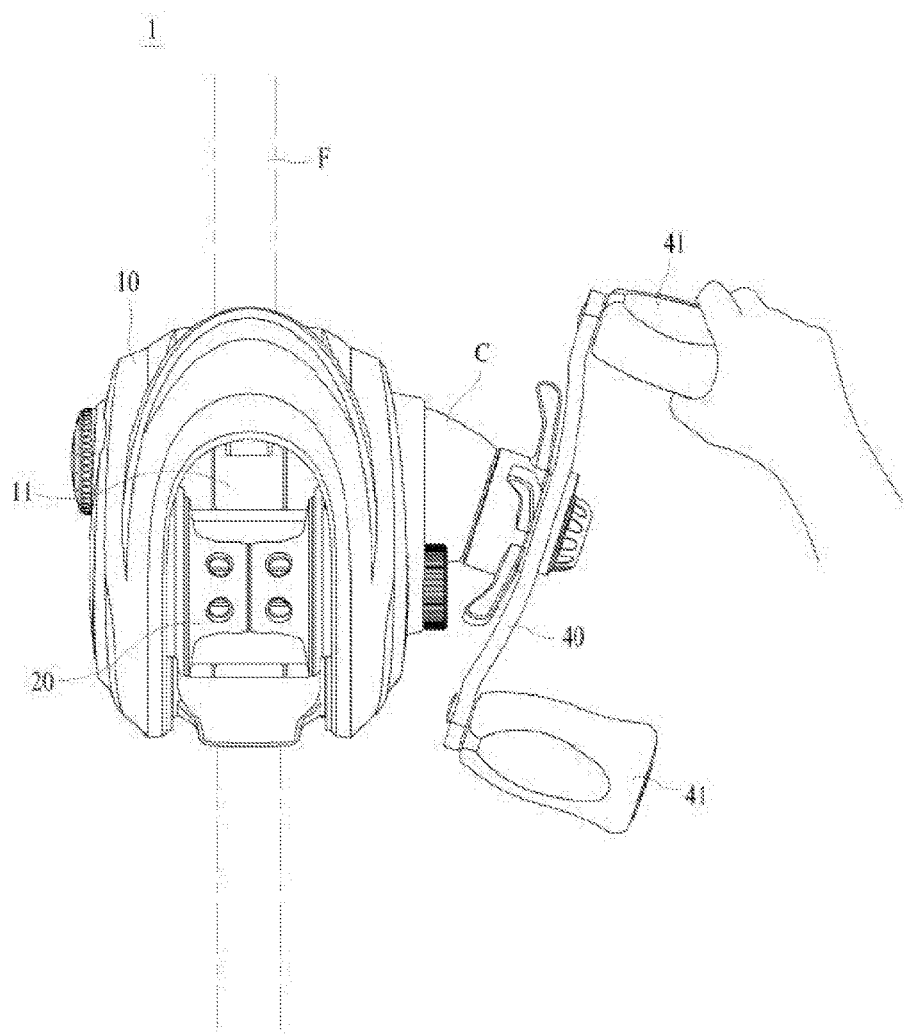
FIG. 4 is a view showing a fishing reel according to the present disclosure.

As shown in FIGS. 2 to 4, the present disclosure provides the fishing reel 1 capable of preventing the wrist from being bent by changing the angle for rotating the fishing wheel to wind the fishing line. The fishing reel 1 includes a body to mounted on a fishing rod F through a coupling hole 11 formed in the lower side portion of the body; a spool 20 installed inside the body to so as to be rotatable to allow the fishing line to be wound or unwound; and a fishing wheel 40 connected to a spool shaft gearshift 30 for inducing rotation of the spool 20 to rotate the spool 20.

The fishing wheel 40 is connected to the spool shaft gearshift 30. The fishing wheel 40 is connected to the spool shaft gearshift 30 via angle variation means 50. Thus, the spool 20 can be rotated while the user changing the angle at which the fishing wheel 40 is connected to the spool shaft gearshift 30.

In this way, the fishing wheel 40 is not connected to the spool shaft gearshift 30 at a right angle. Thus, when the user rotates the fishing wheel 40 during fishing, the wrist is prevented from being bent. Thus, the user will be able to enjoy fishing.

As shown FIG. 3A, the angle variation means 50 includes a bevel gear system. The angle variation means 50 may remain connected to the spool shaft gearshift 30 at a modified angle. In this state, the user may rotate the fishing wheel 40. The connection angle between the fishing wheel 40 and the spool shaft gearshift 30 is preferably maintained at 20 to 30 degrees. Various connection angels are possible according to user requirements such as user's body size or fishing pattern. It is further preferred that the angle variation means 50 comprises an obtuse angle bevel gear system.

The angle variation means 50 may be detachably coupled to the fishing wheel 40. Thereby, the fishing wheel 40 can be separated from the angle variation means 50 to replace old parts. The connection angle between the spool shaft gearshift 30 and the fishing wheel 40 may be varied through a removable coupling between the fishing wheel 40 and the angle variation means 50.

As shown in FIG. 3B, the angle variation means 50 may be embodied as a universal joint or a constant velocity joint. In this connection, the angle variation means 50 realizes the angle-variable connection between the spool shaft gearshift 30 and the fishing wheel 40. When the user holds and rotates the hand grip 41 of the fishing wheel 40, the angle at which the fishing wheel 40 is rotated may be varied.

In this way, by connecting the spool shaft gearshift 30 and the fishing wheel 40 to each other via the angle variation means 50 embodied as the bevel gear system, the universal joint or the constant velocity joint, the fishing wheel 40 is not connected in a direction orthogonal to the spool shaft gearshift 30. Thus, when the user rotates the fishing wheel 40 during fishing, the wrist of the user holding the hand grip 41 is prevented from being bent. In this way, the user can enjoy fishing comfortably in a state in which the rotation action does not give a load to the wrist or cause pain.

Further, the angle variation means 50 may be located inside a gear cover C connecting the body to and the fishing wheel 40. Thereby, the angle variation means 50 is prevented from coming into contact with a liquid substance or a foreign matter. The angle variation means 50 is protected from the outside air via the gear cover C, whereby the durability thereof is maintained.

To illustrate the fishing reel 1 according to the present disclosure, the bait-cast reel is mainly exemplified. However, the present disclosure is not limited thereto. The angle variation means 50 of the fishing reel 1 according to the present disclosure may also be applied as means for connecting a fishing wheel to a spool shaft gearshift for a spinning reel.

As a result, in the fishing reel according to the present disclosure, the fishing wheel is not perpendicularly connected to the spool shaft gearshift via angle variation means. Thus, when the user rotates the fishing wheel during fishing, the wrist of the user is prevented from being bent, so that it is possible to perform fishing comfortably in a state in which the occurrence of pain in the wrist is suppressed. There is no inconvenience to rotate the fishing wheel even when the user's posture changes variously during fishing. When pulling the captured fish toward the user, the fishing wheel is easy to rotate, and the user can quickly cope with it. The rotational power generated from the fishing wheel can be effectively transmitted to the spool. The present disclosure is applicable to both the spinning reel and the bait-cast reel, thereby increasing versatility thereof. In addition, the present disclosure makes it possible for a novice who is new to fishing to use the fishing rod comfortably.

The above embodiments are merely examples, and the present disclosure is not limited thereto. Any form having substantially the same constitution as taught from the technical idea described in the claims of the present disclosure and achieving the same operational effect may be included in the scope of the present disclosure.

Using the fishing reel according to the present disclosure, when the user rotates the fishing wheel during fishing, the user's wrist bending is prevented and the occurrence of wrist pain is suppressed. Thereby, the user can enjoy fishing comfortably. Further, the rotational power generated from the fishing wheel can be effectively transmitted to the spool. Beginners who are new to fishing can use the present fishing reel comfortably.

What is claimed is:

1. A fishing reel comprising:
   a main body mounted on a fishing rod;
   a spool for allowing a fishing line to be wound or unwound, the spool being installed on the main body so as to be rotatable; and
   a fishing wheel for rotating the spool, the fishing wheel being connected to a spool shaft gearshift which induces rotation of the spool, wherein the fishing wheel is connected to the spool shaft gearshift via a joint, wherein a connection angle between the wheel and the gearshift varies by the joint to reduce strain applied on a user's wrist while rotating the spool, wherein the joint includes a bevel gear system, wherein the bevel gear system is configured to enable the fishing wheel to be rotated in a state in which the angle of connection between the fishing wheel and the spool shaft gearshift is variable.

2. The fishing reel of claim 1, wherein the angle of connection between the fishing wheel and the spool shaft gearshift is in a range of 20 to 30°.

3. The fishing reel of claim 1, wherein the joint is detachably coupled to the fishing wheel.

4. A fishing reel comprising:

a main body mounted on a fishing rod;

a spool for allowing a fishing line to be wound or unwound, the spool being installed on the main body so as to be rotatable; and a fishing wheel for rotating the spool, the fishing wheel being connected to a spool shaft gearshift which induces rotation of the spool, wherein the fishing wheel is connected to the spool shaft gearshift via a joint, wherein a connection angle between the wheel and the gearshift varies by the joint to reduce strain applied on a user's wrist while rotating the spool, wherein the joint includes a universal joint or a constant velocity joint, wherein the universal joint or constant velocity joint is configured to enable the fishing wheel to be rotated in a state in which the angle of connection between the fishing wheel and the spool shaft gearshift is variable.

* * * * *